(12) United States Patent
Manolakos et al.

(10) Patent No.: US 11,362,785 B2
(45) Date of Patent: Jun. 14, 2022

(54) SIGNALING SEQUENCES OF SOUNDING REFERENCE SIGNAL RESOURCE INDICATOR COLLECTIONS FOR UPLINK REPETITIONS

(71) Applicant: QUALCOMM Incorporated, San Diego, CA (US)

(72) Inventors: Alexandros Manolakos, San Diego, CA (US); Seyedkianoush Hosseini, San Diego, CA (US); Seyed Ali Akbar Fakoorian, San Diego, CA (US); Mostafa Khoshnevisan, San Diego, CA (US); Wei Yang, San Diego, CA (US); Hung Dinh Ly, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 16/939,888

(22) Filed: Jul. 27, 2020

(65) Prior Publication Data
US 2021/0050971 A1 Feb. 18, 2021

(30) Foreign Application Priority Data
Aug. 13, 2019 (GR) .............................. 20190100351

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ........................... H04L 5/0048; H04W 72/042
See application file for complete search history.

(56) References Cited

PUBLICATIONS

Huawei, et al., "Summary of AI: 7.2.8.2 Enhancements on Multi-TRP/Panel Transmission of Offline Discussion", 3GPP Draft, 3GPP TSG RANWG1 Ad-Hoc Meeting 1901, R1-1901371 Feature Lead Summary for Enhancements on Multi-TRP V3, 3rd Generation Partnership Project (3GPP), Mobile Competence Centre, 650, Route Des Lucioles, F-06921 Sophia-Antipolis CE, vol. RAN WG1, No. Taipei, Jan. 21-25, 2019, Jan. 23, 2019 (Jan. 23, 2019), XP051594129, 39 Pages, Retrieved from the Internet: URL: http://www.3gpp.org/ftp/Meetings%5F3GPP%5FSYNC/.

(Continued)

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment may receive at least one sounding reference signal (SRS) resource set configuration for a plurality of SRS resources that correspond to respective SRS ports on which an SRS is to be transmitted; transmit SRSs using the SRS resources; receive downlink control information that identifies a sequence of SRS resource indicator (SRI) collections, where an SRI collection identifies one or more of the SRS resources used for transmitting the SRSs; and transmit a plurality of repetitions of an uplink communication based at least in part on the sequence of SRI collections, where a repetition is transmitted using one or more uplink ports that correspond to one or more SRS ports associated with the one or more SRS resources identified based at least in part on the SRI collection. Numerous other aspects are provided.

30 Claims, 7 Drawing Sheets

(56) References Cited

PUBLICATIONS

International Search Report and Written Opinion—PCT/US2020/070317—ISAEPO—dated Nov. 12, 2020.

LG Electronics: "Feature Lead Summary#3 of Enhancements on Multi-beam Operations", 3GPP Draft, 3GFF TSG RAN WG1 Meeting #97, R1-1907860_R1#97_FL_SUMMARY#3_MULTIBEAM(MB1), 3rd Generation Partnership Project (3GPP), Mobile Competence Centre, 650, Route Des Lucioles, F-06921 Sophia-Antipolis Cedex, France, vol. RAN WG1, No. Reno, USA, May 13-17, 2019, May 17, 2019 (May 17, 2019), XP051740132, pp. 1-35, Retrieved from the Internet: URL: http://www.3gpp.org/ftp/tsg%5Fran/WG1%5FRL1/TSGR1%5F97/Docs/R1%2D1907860%.

NTT Docomo, Inc., "Discussion on Multi-beam Enhancement," 3GPP Draft, 3GPP TSG RAN WG1 #97, R1-1906225, 3rd Generation Partnership Project (3GPP), Mobile Competence Centre, 650, Route Des Lucioles, F-06921, Sophia-Antipolis Cedex, France, vol. RAN WG1, No. Reno, USA, May 13-17, 2019, May 13, 2019 (May 13, 2019), XP051727679, pp. 1-24, Retrieved from the Internet: URL:http://www.3gpp.org/ftp/Meetings%5F3GPP%5FSYNC/RAN1/Docs/R1%2D1906225%2Ezip [retrieved on May 13, 2019] section 4.1.

SIGNALING SEQUENCES OF SOUNDING REFERENCE SIGNAL RESOURCE INDICATOR COLLECTIONS FOR UPLINK REPETITIONS

CROSS-REFERENCE TO RELATED APPLICATION

This Patent Application claims priority to Greek Patent Application No. 20190100351, filed on Aug. 13, 2019, entitled "SIGNALING SEQUENCES OF SOUNDING REFERENCE SIGNAL RESOURCE INDICATOR COLLECTIONS FOR UPLINK REPETITIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for signaling sequences of sounding reference signal (SRS) resource indicator (SRI) collections for uplink repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving at least one SRS resource set configuration for a plurality of SRS resources that correspond to respective SRS ports on which an SRS is to be transmitted; transmitting SRSs using the SRS resources; receiving downlink control information that identifies a sequence of SRI collections, wherein an SRI collection identifies one or more of the SRS resources used for transmitting the SRSs; and transmitting a plurality of repetitions of an uplink communication based at least in part on the sequence of SRI collections, wherein a repetition is transmitted using one or more uplink ports that correspond to one or more SRS ports associated with the one or more SRS resources identified based at least in part on the SRI collection.

In some aspects, a method of wireless communication, performed by a base station, may include transmitting at least one SRS resource set configuration for a plurality of SRS resources; receiving SRSs in the SRS resources; determining a sequence of SRI collections that is to be used by a UE to transmit a plurality of repetitions of an uplink communication, wherein an SRI collection identifies one or more of the SRS resources used for receiving the SRSs; and transmitting downlink control information to the UE that identifies the sequence of SRI collections.

In some aspects, a UE for wireless communication may include memory and one or more processors operatively coupled to the memory. The memory and the one or more processors may be configured to receive at least one SRS resource set configuration for a plurality of SRS resources that correspond to respective SRS ports on which an SRS is to be transmitted; transmit SRSs using the SRS resources; receive downlink control information that identifies a sequence of SRI collections, wherein an SRI collection identifies one or more of the SRS resources used for transmitting the SRSs; and transmit a plurality of repetitions of an uplink communication based at least in part on the sequence of SRI collections, wherein a repetition is transmitted using one or more uplink ports that correspond to one or more SRS ports associated with the one or more SRS resources identified based at least in part on the SRI collection.

In some aspects, a base station for wireless communication may include memory and one or more processors operatively coupled to the memory. The memory and the one or more processors may be configured to transmit at least one SRS resource set configuration for a plurality of SRS resources; receive SRSs in the SRS resources; determine a sequence of SRI collections that is to be used by a UE to transmit a plurality of repetitions of an uplink communication, wherein an SRI collection identifies one or more of the SRS resources used for receiving the SRSs; and transmit downlink control information to the UE that identifies the sequence of SRI collections.

In some aspects, a non-transitory computer-readable medium may store one or more instructions for wireless communication. The one or more instructions, when executed by one or more processors of a UE, may cause the one or more processors to receive at least one SRS resource set configuration for a plurality of SRS resources that correspond to respective SRS ports on which an SRS is to be transmitted; transmit SRSs using the SRS resources; receive downlink control information that identifies a sequence of SRI collections, wherein an SRI collection identifies one or more of the SRS resources used for transmitting the SRSs; and transmit a plurality of repetitions of an uplink communication based at least in part on the sequence of SRI collections, wherein a repetition is transmitted using one or more uplink ports that correspond to one or more SRS ports associated with the one or more SRS resources identified based at least in part on the SRI collection.

In some aspects, a non-transitory computer-readable medium may store one or more instructions for wireless communication. The one or more instructions, when executed by one or more processors of a base station, may cause the one or more processors to transmit at least one SRS resource set configuration for a plurality of SRS resources; receive SRSs in the SRS resources; determine a sequence of SRI collections that is to be used by a UE to transmit a plurality of repetitions of an uplink communication, wherein an SRI collection identifies one or more of the SRS resources used for receiving the SRSs; and transmit downlink control information to the UE that identifies the sequence of SRI collections.

In some aspects, an apparatus for wireless communication may include means for receiving at least one SRS resource set configuration for a plurality of SRS resources that correspond to respective SRS ports on which an SRS is to be transmitted; means for transmitting SRSs using the SRS resources; means for receiving downlink control information that identifies a sequence of SRI collections, wherein an SRI collection identifies one or more of the SRS resources used for transmitting the SRSs; and means for transmitting a plurality of repetitions of an uplink communication based at least in part on the sequence of SRI collections, wherein a repetition is transmitted using one or more uplink ports that correspond to one or more SRS ports associated with the one or more SRS resources identified based at least in part on the SRI collection.

In some aspects, an apparatus for wireless communication may include means for transmitting at least one SRS resource set configuration for a plurality of SRS resources; means for receiving SRSs in the SRS resources; means for determining a sequence of SRI collections that is to be used by a UE to transmit a plurality of repetitions of an uplink communication, wherein an SRI collection identifies one or more of the SRS resources used for receiving the SRSs; and means for transmitting downlink control information to the UE that identifies the sequence of SRI collections.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
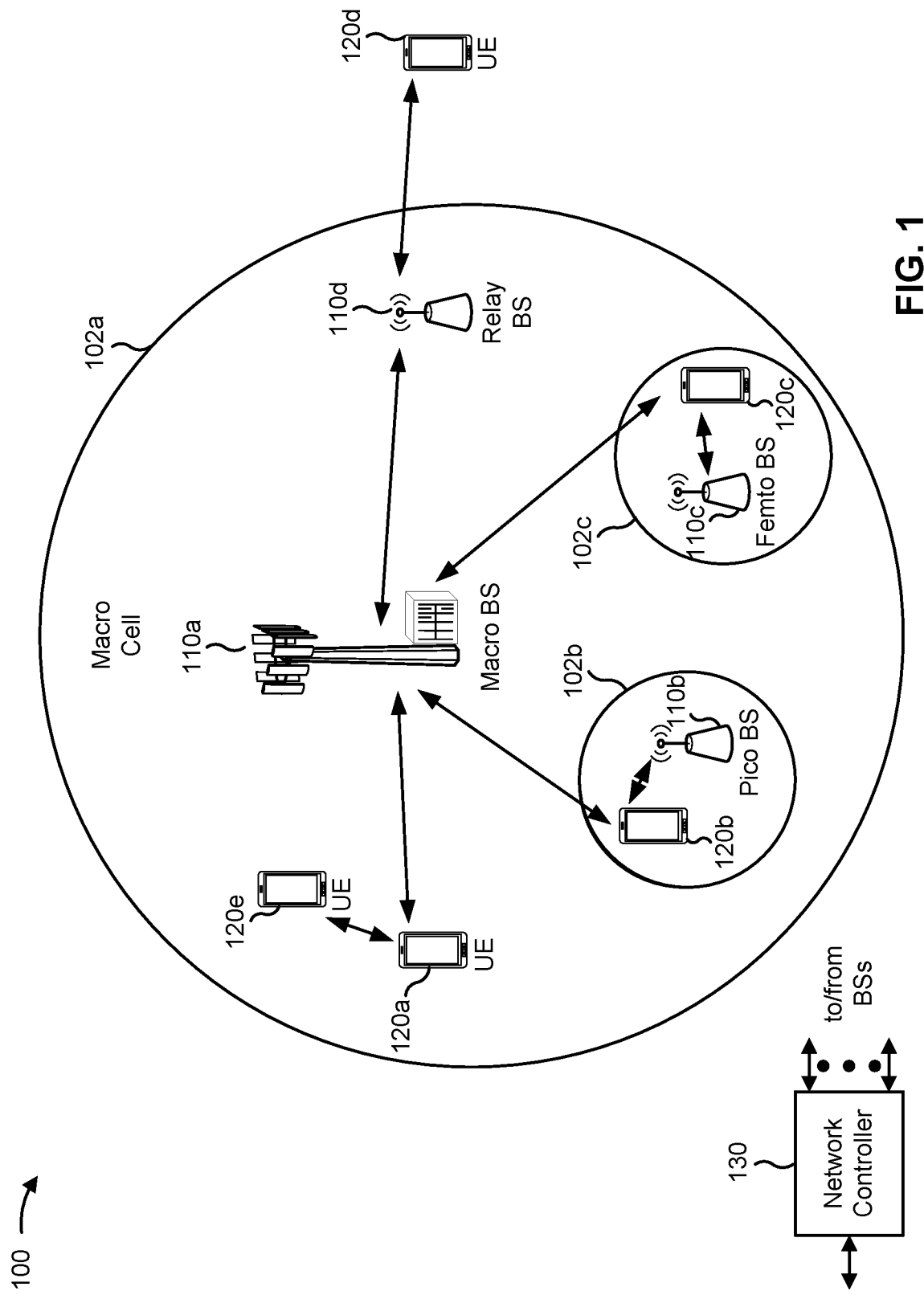
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
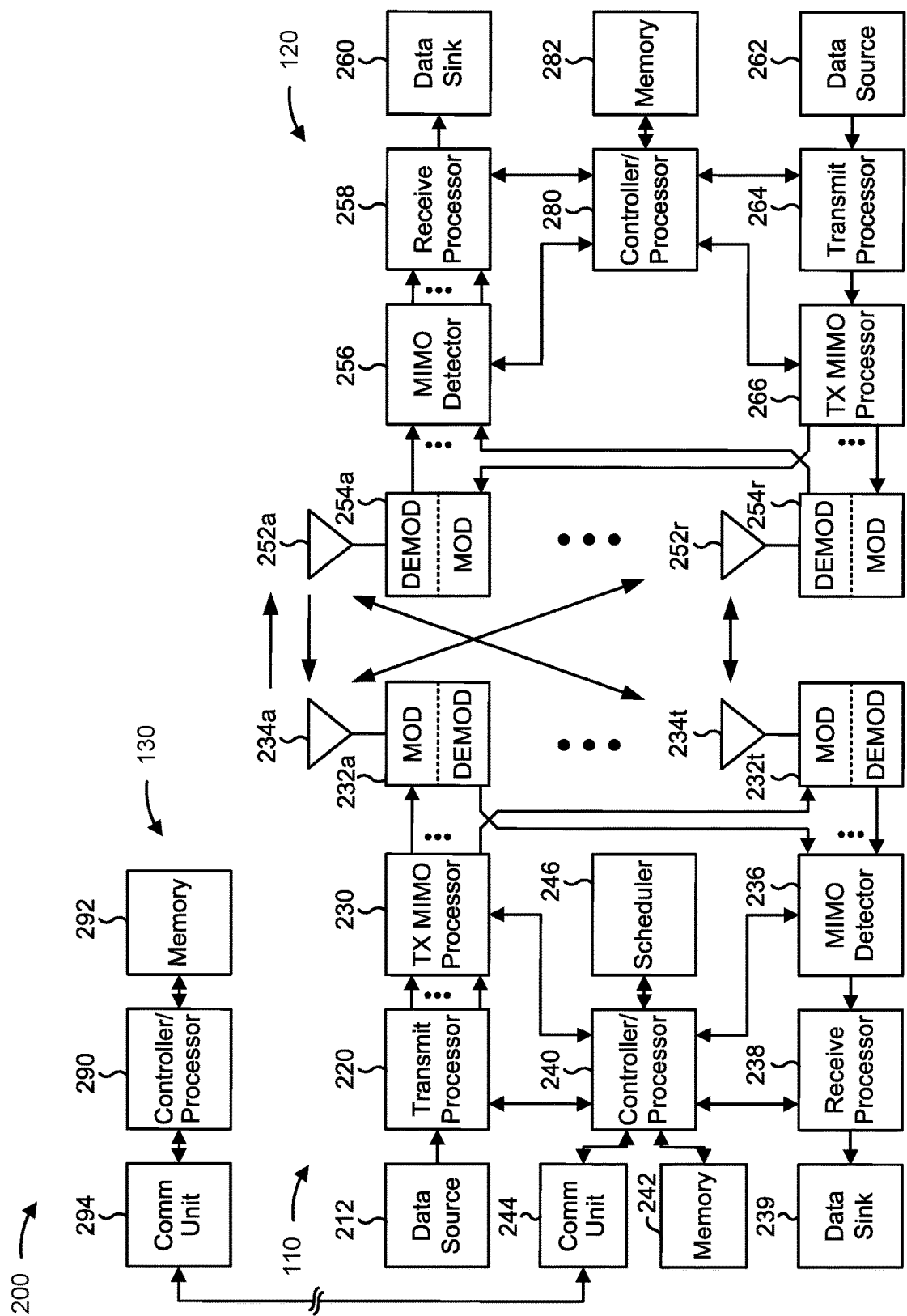
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling sequences of SRI collections for uplink repetitions, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for receiving at least one SRS resource set configuration for a plurality of SRS resources that correspond to respective SRS ports on which an SRS is to be transmitted, means for transmitting SRSs using the SRS resources, means for receiving downlink control information that identifies a sequence of SRI collections, means for transmitting a plurality of repetitions of an uplink communication based at least in part on the sequence of SRI collections, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting at least one SRS resource set configuration for a plurality of SRS resources, means for receiving SRSs in the SRS resources, means for determining a sequence of SRI collections that is to be used by a UE to transmit a plurality of repetitions of an uplink communication, means for transmitting downlink control information to the UE that identifies the sequence of SRI collections, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
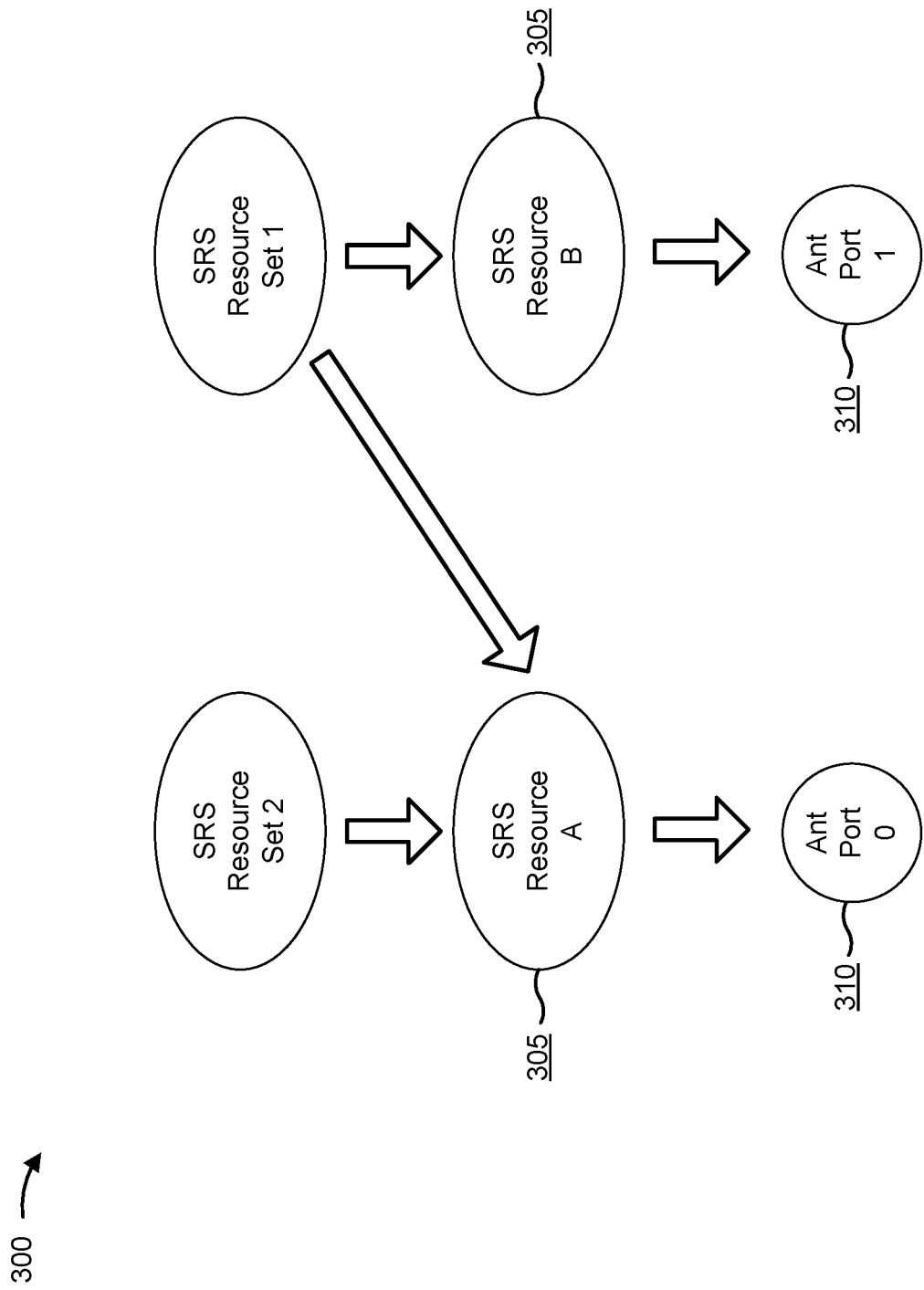
FIG. 3 is a diagram illustrating an example of configuring SRS resource sets, in accordance with various aspects of the present disclosure.

FIG. 3 is a diagram illustrating an example 300 of configuring SRS resource sets, in accordance with various aspects of the present disclosure.

A base station may configure a UE with one or more SRS resource sets to allocate resources for SRS transmissions by the UE. For example, a configuration for SRS resource sets may be indicated in a radio resource control (RRC) message (e.g., an RRC configuration message, an RRC reconfiguration message, and/or the like). As shown by reference number 305, an SRS resource set may include one or more resources (e.g., shown as SRS resources), which may include time resources and/or frequency resources (e.g., a slot, a symbol, a resource block, a periodicity for the time resources, and/or the like).

As shown by reference number 310, an SRS resource may correspond to an antenna port (e.g., an SRS port) on which an SRS is to be transmitted (e.g., in a time-frequency resource). In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink channel state information (CSI) with reciprocity between an uplink channel and a downlink channel. For example, when there is reciprocity between an uplink channel and a downlink channel, a base station may use an antenna switching SRS (e.g., an SRS transmitted using a resource of an antenna switching SRS resource set) to acquire downlink CSI (e.g., to determine a downlink precoder to be used to communicate with the UE).

A codebook SRS resource set may be used to indicate uplink CSI when a base station indicates an uplink precoder to the UE. For example, when the base station is configured to indicate an uplink precoder to the UE (e.g., using a precoder codebook), the base station may use a codebook SRS (e.g., an SRS transmitted using a resource of a codebook SRS resource set) to acquire uplink CSI (e.g., to determine an uplink precoder to be indicated to the UE and used by the UE to communicate with the base station).

A non-codebook SRS resource set may be used to indicate uplink CSI when the UE selects an uplink precoder (e.g., instead of the base station indicating an uplink precoder to be used by the UE). For example, when the UE is configured to select an uplink precoder, the base station may use a non-codebook SRS (e.g., an SRS transmitted using a resource of a non-codebook SRS resource set) to acquire uplink CSI. In this case, the non-codebook SRS may be precoded using a precoder selected by the UE (e.g., which may be indicated to the base station).

A beam management SRS resource set may be used for indicating CSI for millimeter wave communications.

The UE may transmit SRSs to the base station using the SRS resources of the SRS resource set configuration. The SRS resources used for the SRS transmissions may be identified by SRIs. Additionally, the SRS resources may be SRS resources of a non-codebook SRS resource set. The base station may determine, based on the SRS transmissions, one or more SRS resources (corresponding to one or more SRS ports) that the UE is to use to transmit an uplink communication. The base station may transmit downlink control information (DCI) to the UE that provides an indication of the determined SRS resources. For example, the determined SRS resources may be indicated in an SRI field of the DCI. The SRI field may be allocated four bits, thereby enabling the base station to indicate one of sixteen possible SRS resource combinations (e.g., combinations of up to four SRS resources with a transmission rank of one, two, three, or four) using the SRI field. The UE may transmit the uplink communication (e.g., via a physical uplink shared channel (PUSCH)) using uplink port(s) corresponding to the SRS port(s) of the SRS resources identified by the SRI of the DCI.

In some cases, the UE may be configured to transmit multiple repetitions of the uplink communication. For example, the UE may transmit multiple repetitions of the uplink communication over different beams to improve transmission diversity of the uplink communication. However, according to current wireless communication systems, each repetition that uses a different beam is separately scheduled by DCI. For example, each repetition is scheduled by DCI indicating a particular SRI for the repetition, thereby resulting in increased latency.

Some techniques and apparatuses described herein enable a base station to indicate, using a single DCI, a sequence of SRI collections for multiple repetitions of an uplink communication, thereby reducing latency associated with separately scheduling the multiple repetitions. In this way, a UE may improve transmission diversity by transmitting multiple repetitions of an uplink communication using different beams, different precoders, different antenna panels, and/or the like, according to the sequence of SRI collections.

As indicated above, FIG. 3 is provided as an example. Other examples may differ from what is described with regard to FIG. 3.

Figure 4:
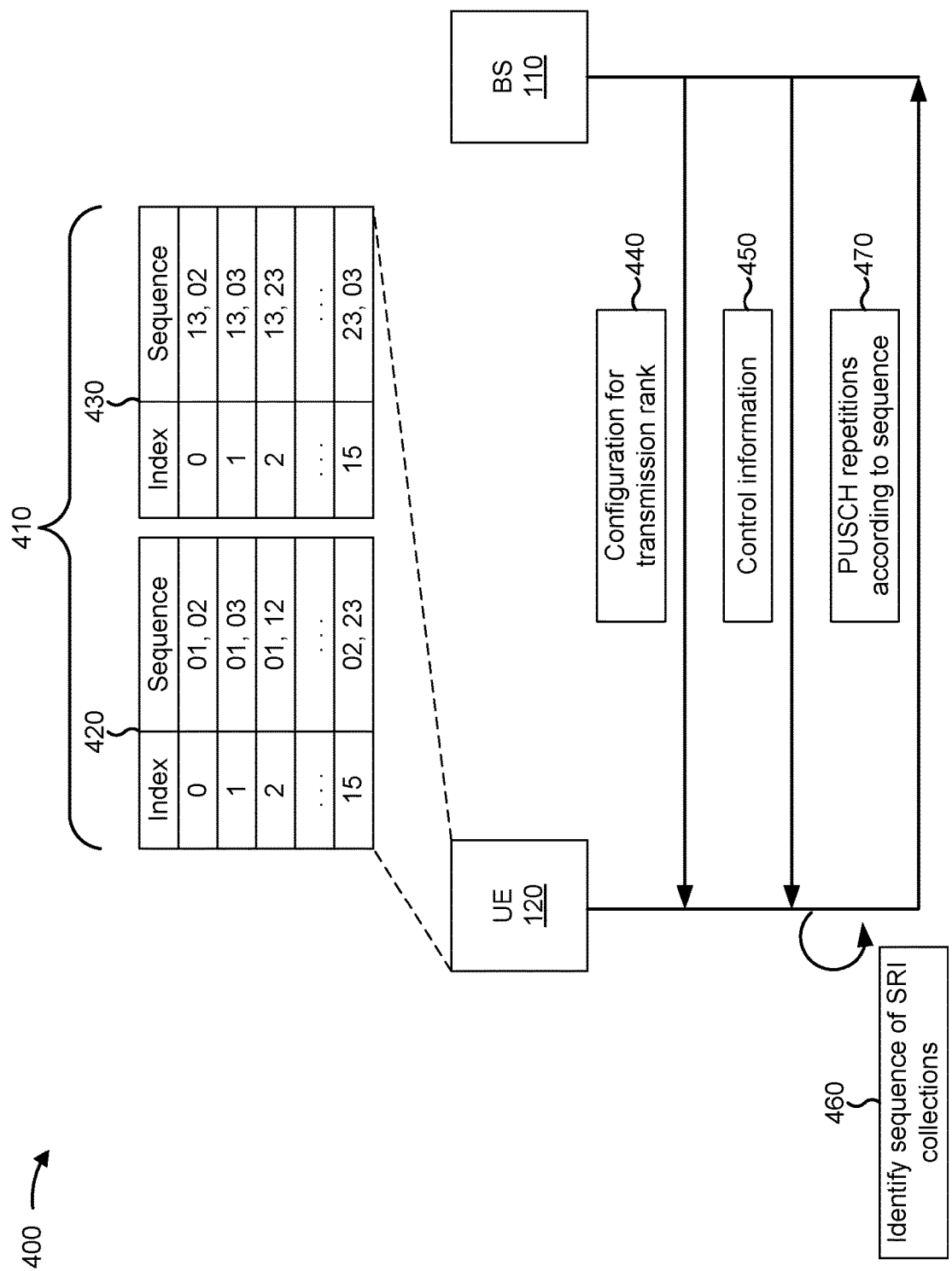
FIGS. 4 and 5 are diagrams illustrating examples of signaling sequences of SRI collections for uplink repetitions, in accordance with various aspects of the present disclosure.

FIG. 4 is a diagram illustrating an example 400 of signaling sequences of SRI collections for uplink repetitions, in accordance with various aspects of the present disclosure. As shown in FIG. 4, a base station 110 may provide information to a UE 120 in order to enable the UE 120 to identify a sequence of SRI collections that is to be used by the UE 120 for transmitting multiple repetitions of an uplink communication. In some aspects, the UE 120 may be configured with a mapping of sequences of SRI collections to index values. For example, the base station 110 may transmit a configuration for the mapping to the UE 110 via RRC signaling or a medium access control (MAC) control element (CE).

In some aspects, the UE 120 may be configured with a set of mappings relating to a particular transmission rank (e.g., a particular quantity of transmission layers). For example, the UE 120 may be configured with a first set of mappings relating to a transmission rank of one (i.e., an SRI collection of the mapping identifies one SRS resource), a second set of mappings relating to a transmission rank of two (i.e., an SRI collection of the mapping identifies two SRS resources), a third set of mappings relating to a transmission rank of three (i.e., an SRI collection of the mapping identifies three SRS resources), a fourth set of mappings relating to a transmission rank of four (i.e., an SRI collection of the mapping identifies four SRS resources), and/or the like.

As shown in FIG. 4, a set of mappings 410 may relate to a transmission rank of two. The sequences of the set of mappings 410 may identify SRI collections for a particular quantity of repetitions. For example, the sequences of the set of mappings 410 identify SRI collections for two repetitions. In some aspects, the sequences may identify SRI collections for another amount of repetitions (e.g., four repetitions, eight repetitions, sixteen repetitions, and/or the like). Each SRI collection (e.g., 01) of a sequence may include one or more SRIs that identify one or more SRS resources, corresponding to one or more antenna ports (i.e., SRS ports) of the UE 120. For example, SRI collection 01 may identify SRS port 0 and SRS port 1 of the UE 120.

The set of mappings 410 may include a first mapping 420 of sequences of SRI collections to index values and a second mapping 430 of sequences of SRI collections to index values. In some aspects, a set of mappings 410 may include more than two mappings. The first mapping 420 and the second mapping 430 (and any other mappings included in the set of mappings 410) may be indexed according to the same index values. In other words, a first sequence of the first mapping 420 may be indexed to a first index value (index=0) and a first sequence of the second mapping 430 also may be indexed to the first index value (index=0), a second sequence of the first mapping 420 may be indexed to a second index value (index=1) and a second sequence of the second mapping 430 also may be indexed to the second index value (index=1), and so forth. In this way, the set of mappings 410 may identify any quantity of sequences of SRI collections (e.g., thirty-two sequences) using a relatively smaller quantity of index values (e.g., sixteen index values).

As shown in FIG. 4, and by reference number 440, the base station 110 may transmit, and the UE 120 may receive, a configuration that identifies a transmission rank. For example, the base station 110 may transmit the configuration that identifies the transmission rank via RRC signaling or a MAC CE. The transmission rank may enable the UE 120 to identify a particular set of mappings that is to be used by the UE 120. For example, a configuration that identifies a transmission rank of two may enable the UE 120 to identify that the set of mappings 410 (which identifies SRI collections of a transmission rank of two) is to be used by the UE 120. In some aspects, the configuration may configure multiple repetitions of a communication, associated with the transmission rank, over multiple PUSCHs.

As shown by reference number 450, the base station 110 may transmit, and the UE 120 may receive, control information (e.g., DCI, such as in DCI format 0_1) that provides scheduling for a communication of the UE 120 on a PUSCH. For example, the control information may schedule multiple repetitions of the communication over multiple PUSCHs (e.g., the control information may schedule a first PUSCH and a second PUSCH). The control information also may identify a sequence of SRI collections that is to be used by the UE 120 to transmit the multiple repetitions of the communication.

In some aspects, the control information may identify the sequence of SRI collections using a first field and a second field of the control information. For example, the first field may be an SRI field of the control information and the second field may be an antenna port field of the control information. In some cases, the SRI field may be allocated four bits, thereby permitting up to sixteen sequences of SRI collections to be identified by the SRI field. In some cases, the antenna port field of the control information may be allocated one or more reserved bits. Accordingly, using one reserved bit of the antenna port field in combination with the four bits of the SRI field permits identification of up to thirty-two sequences of SRI collections. Moreover, additional sequences of SRI collections may be identified when the antenna port field is allocated more than one reserved bit.

In some aspects, a value of the first field (e.g., the SRI field) identifies an index value of a set of mappings (e.g., a set of mappings having the transmission rank indicated by the configuration), and a value of the second field (e.g., a value indicated in one or more reserved bits of the antenna port field) identifies a particular mapping of the set of mappings. For example, with reference to the set of mappings 410, the first field (e.g., the SRI field) may indicate an index value of 2, which may refer to the sequence 01, 12 of the first mapping 420 or the sequence 13, 23 of the second mapping 430. Continuing with the previous example, the second field (e.g., the antenna port field) may have a value of 0 to indicate that the index value of 2 refers to the first mapping 420 or a value of 1 to indicate that the index value of 2 refers to the second mapping 430.

As shown by reference number 460, the UE 120 may identify a sequence of SRI collections based on the control information. For example, the UE 120 may process the control information in order to identify a value of the first field and a value of the second field. Based on the value of the first field (e.g., 2) and the value of the second field (e.g., 1), and with reference to the set of mappings 410, the UE 120 may identify the sequence of SRI collections (e.g., 13, 23). For example, the UE 120 may identify an index value of the set of mappings 410 based on the value of the first field (e.g., the SRI field) and may identify a particular mapping of the set of mappings 410 based on the value of the second field (e.g., a value indicated in one or more reserved bits of the antenna port field).

As shown by reference number 470, the UE 120 may transmit multiple repetitions (e.g., to multiple TRPs) of an uplink communication (e.g., a transport block) according to the identified sequence of SRI collections. In some aspects, the UE 120 may determine one or more uplink ports that are to be used for a repetition based on one or more SRS resources identified by an SRI collection. For example, an SRS resource may correspond to an SRS port (e.g., antenna port 1), and the UE 120 may determine a corresponding uplink port (e.g., antenna port 1) based on the SRS port.

The UE 120 may use a first SRI collection of the sequence (e.g., 13), which indicates a first combination of uplink ports, to transmit a first repetition (e.g., a first PUSCH), a second SRI collection of the sequence (e.g., 23), which indicates a second combination of uplink ports, to transmit a second repetition (e.g., a second PUSCH), and so forth. In some cases, a quantity of repetitions configured for the UE 120 may be greater than a quantity of SRI collections in the sequence. In such cases, the UE 120 may transmit sequential repetitions using sequential cycles through the sequence of SRI collections.

As indicated above, FIG. 4 is provided as an example. Other examples may differ from what is described with regard to FIG. 4.

Figure 5:
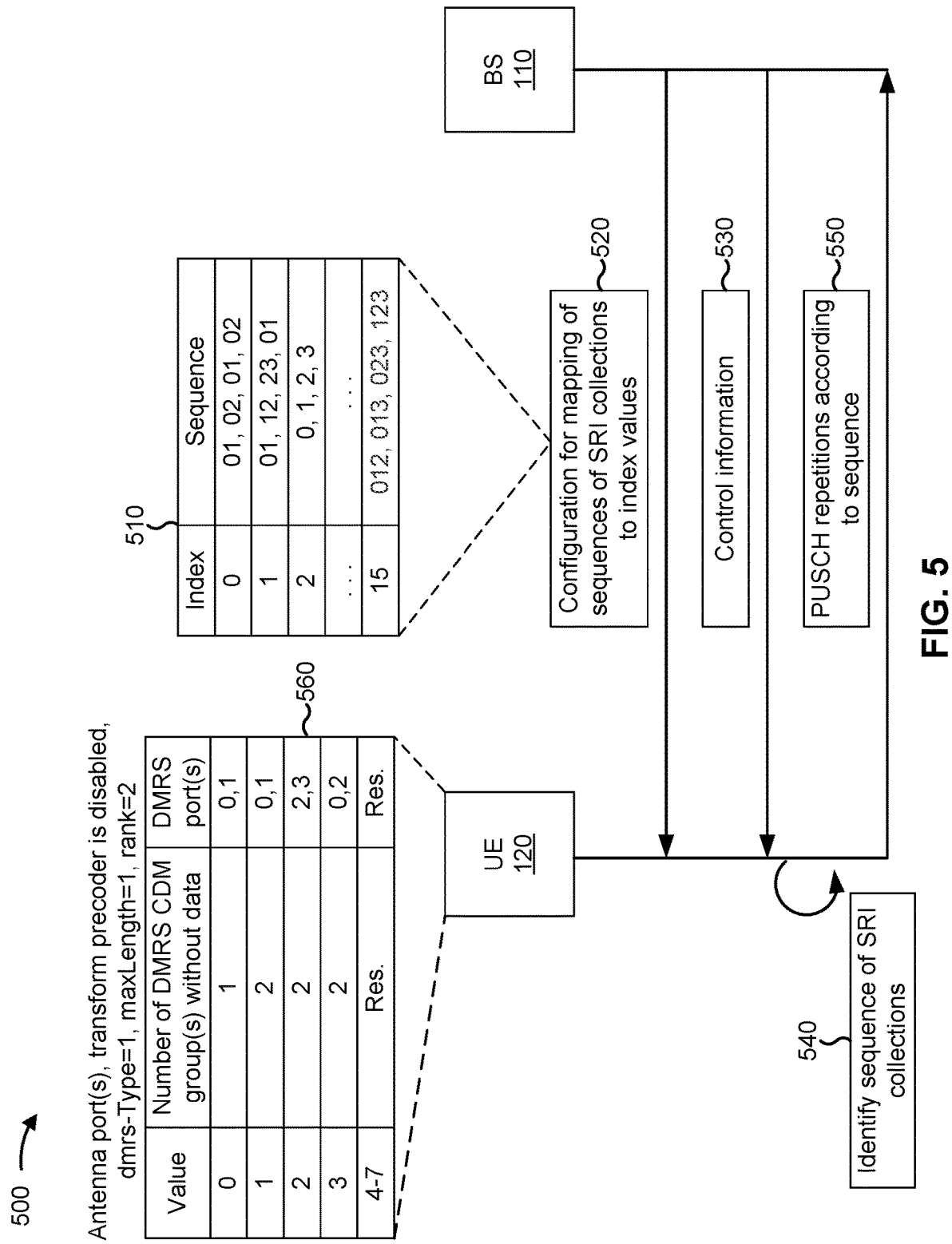

FIG. 5 is a diagram illustrating an example 500 of signaling sequences of SRI collections for uplink repetitions, in accordance with various aspects of the present disclosure. As shown in FIG. 5, a base station 110 may provide information to a UE 120 in order to enable the UE 120 to identify a sequence of SRI collections that is to be used by the UE 120 for transmitting multiple repetitions of an uplink communication.

As shown in FIG. 5, and by reference number 520, the base station 110 may transmit, and the UE 120 may receive, a configuration for a mapping (e.g., a mapping 510) of sequences of SRI collections to index values. For example, the base station 110 may transmit a configuration that identifies the mapping via RRC signaling. In some aspects, the configuration, or another RRC configuration, also may identify whether the UE 120 is to use the mapping or use a default interpretation of an SRI indication (e.g., whereby the same precoder or beam is used for all repetitions) for transmitting an uplink communication.

The mapping 510 may identify multiple sequences of SRI collections of different transmission ranks. For example, as shown in FIG. 5, the mapping 510 identifies two sequences of SRI collections having a transmission rank of two (index=0, index=1), a sequence of SRI collections having a transmission rank of one (index=2), and a sequence of SRI collections having a transmission rank of three (index=15). The sequences of the mapping 510 may identify SRI collections for a particular quantity of repetitions. For example, as shown in FIG. 5, the sequences of the mapping 510 identify SRI collections for four repetitions. In some aspects, the sequences may identify SRI collections for another amount of repetitions (e.g., two repetitions, eight repetitions, sixteen repetitions, and/or the like). In addition, the mapping 510 may identify a quantity of sequences of SRI collections (e.g., sixteen) that corresponds to a quantity of sequences identifiable by a field (e.g., an SRI field, which may be allocated four bits) of control information transmitted by the base station 110.

In some aspects, the mapping 510 may identify multiple sequences of SRI collections of the same transmission rank. In such a case, the mapping 510 may identify a quantity of sequences of SRI collections that is greater than a quantity of sequences identifiable by a field (e.g., an SRI field) of control information transmitted by the base station 110.

In some aspects, the mapping 510 may be a primary mapping that contains a quantity of sequences of SRI collections (e.g., sixty-four sequences) that is greater than a quantity of sequences identifiable by a field (e.g., the SRI field) of control information transmitted by the base station 110. In such a case, the base station 110 may transmit, and the UE 120 may receive, information that identifies a secondary mapping that includes a subset (e.g., a downselection) of sequences of the primary mapping. For example, the secondary mapping may include up to a quantity of sequences of SRI collections that corresponds to a quantity of sequences identifiable by a field (e.g., the SRI field) of control information transmitted by the base station 110. The base station 110 may transmit information that identifies the secondary mapping to the UE 120 via a MAC CE. In this way, the base station 110 may update the secondary mapping more frequently than the primary mapping.

As shown by reference number 530, the base station 110 may transmit, and the UE 120 may receive, control information (e.g., DCI, such as in DCI format 0_1) that provides scheduling for a communication of the UE 120 on a PUSCH. For example, the control information may schedule multiple repetitions of the communication over multiple PUSCHs. The control information also may identify a sequence of SRI collections that is to be used by the UE 120 to transmit the multiple repetitions of the communication. In some aspects, the control information may identify an index value of the mapping 510 (or a secondary mapping). For example, a value of a field (e.g., an SRI field) of the control information may identify the index value. In some aspects, when the mapping 510 identifies sequences of SRI collections of the same transmission rank, the control information may identify the sequence of SRI collections using a first field (e.g., an SRI field) and a second field (e.g., an antenna port field) of the control information.

As shown by reference number 540, the UE 120 may identify a sequence of SRI collections based on the control information. For example, the UE 120 may process the control information in order to identify an index value. Based on the index value, and with reference to the mapping 510, the UE 120 may identify the sequence of SRI collections.

In some aspects, when the mapping 510 identifies sequences of SRI collections of the same transmission rank, the UE 120 may determine that the control information is using a first field (e.g., an SRI field) and a second field (e.g., an antenna port field) to identify the sequence of SRI collections. For example, the UE 120 may determine that the control information is using the first field and the second field to identify the sequence of SRI collections based at least in part on a determination that a quantity of sequences of SRI collections that are identifiable by the first field (e.g., sixteen) is less than a quantity of sequences of SRI collections of the mapping 510 (e.g., thirty-two). In such a case, the UE 120 may process the control information in order to identify a value of the first field and a value of the second field. Based on the value of the first field and the value of the second field, and with reference to the mapping 510, the UE 120 may identify the sequence of SRI collections.

For example, the value of the first field (e.g., an SRI field) may indicate an index location of the sequence in a particular group of sequences, and the value of the second field (e.g., an antenna port field) may indicate the particular group of sequences. Each group of sequences may include up to a quantity of sequences that corresponds to a quantity of sequences that are identifiable by the first field. For example, if the first field (e.g., an SRI field) can identify sixteen sequences and the mapping 510 identifies thirty-two sequences, the UE 120 may determine that the mapping 510 is to be divided into two groups of sixteen sequences. Accordingly, the first group may be identified by a first value of the second field (e.g., 0) and the second group may be identified by a second value of the second field (e.g., 1).

In some aspects, the value of the second field may be indicated in one or more reserved bits of the second field (e.g., one or more reserved bits of an antenna port field). In such cases, the UE 120 may identify a location of the reserved bit(s) in the second field based on a demodulation reference signal (DMRS) identifier of the control information and the transmission rank of the SRI collections of the mapping 510. As shown in FIG. 5, the UE 120 may be configured with one or more DMRS port tables. With reference to DMRS port table 560, a particular combination of a DMRS identifier (e.g., 1) and a transmission rank (e.g., 2) may indicate that the reserved bit(s) are located at rows 4-7 of the second field (e.g., DMRS port table 560).

As shown by reference number 550, the UE 120 may transmit multiple repetitions (e.g., to multiple TRPs) of an uplink communication (e.g., a transport block) according to the identified sequence of SRI collections, as described in more detail above. In some cases, a quantity of repetitions configured for the UE 120 may be greater than a quantity of SRI collections in the sequence. In some aspects, the UE 120 may transmit sequential repetitions using at least one duplicate of each SRI collection in a cycle through the sequence of SRI collections. For example, with reference to the mapping 510, the UE may transmit eight repetitions according to the sequence of index =1 as 01, 01, 12, 12, 23, 23, 01, 01. In some aspects, the UE 120 may transmit sequential repetitions using more than one cycle through the sequence of SRI collections. For example, with reference to the mapping 510, the UE may transmit eight repetitions according to the sequence of index=1 as 01, 12, 23, 01, 01, 12, 23, 01. In some aspects, the base station 110 may transmit (e.g., via RRC signaling) an indication of whether the UE 120 is to transmit repetitions using duplications or multiple cycles.

As indicated above, FIG. 5 is provided as an example. Other examples may differ from what is described with regard to FIG. 5.

Figure 6:
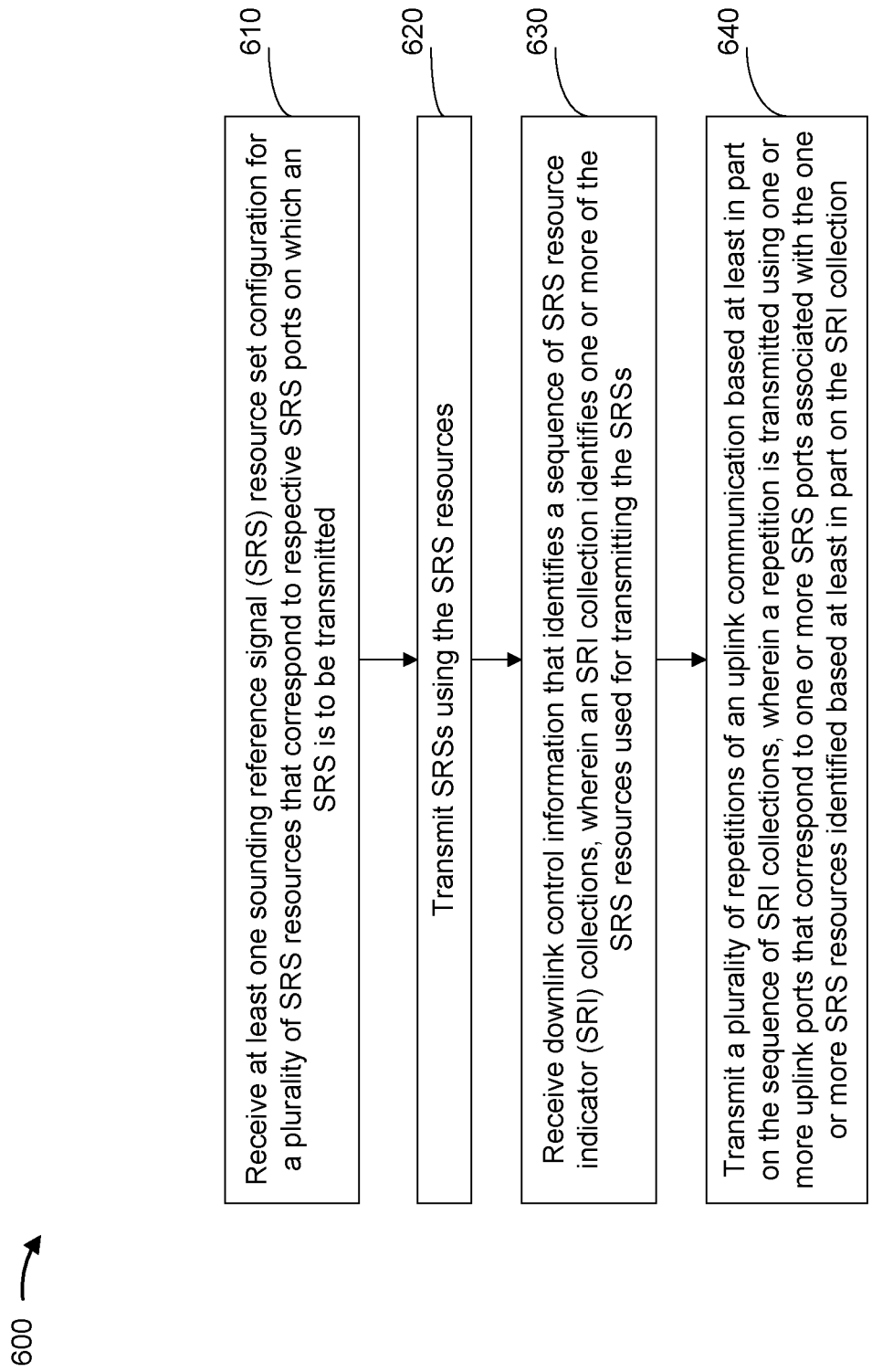
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with signaling sequences of SRI collections for uplink repetitions.

As shown in FIG. 6, in some aspects, process 600 may include receiving at least one SRS resource set configuration for a plurality of SRS resources that correspond to respective SRS ports on which an SRS is to be transmitted (block 610). For example, the UE (e.g., using antenna 252, DEMOD 254, MIMO detector 256, receive processor 258, controller/processor 280, and/or the like) may receive at least one SRS resource set configuration for a plurality of SRS resources that correspond to respective SRS ports on which an SRS is to be transmitted, as described above.

As further shown in FIG. 6, in some aspects, process 600 may include transmitting SRSs using the SRS resources (block 620). For example, the UE (e.g., using controller/processor 280, transmit processor 264, TX MIMO processor 266, MOD 254, antenna 252, and/or the like) may transmit SRSs using the SRS resources, as described above.

As further shown in FIG. 6, in some aspects, process 600 may include receiving downlink control information that identifies a sequence of SRI collections, wherein an SRI collection identifies one or more of the SRS resources used for transmitting the SRSs (block 630). For example, the UE (e.g., using antenna 252, DEMOD 254, MIMO detector 256, receive processor 258, controller/processor 280, and/or the like) may receive downlink control information that identifies a sequence of SRI collections, as described above. In some aspects, an SRI collection identifies one or more of the SRS resources used for transmitting the SRSs.

As further shown in FIG. 6, in some aspects, process 600 may include transmitting a plurality of repetitions of an uplink communication based at least in part on the sequence of SRI collections, wherein a repetition is transmitted using one or more uplink ports that correspond to one or more SRS ports associated with the one or more SRS resources identified based at least in part on the SRI collection (block 640). For example, the UE (e.g., using controller/processor 280, transmit processor 264, TX MIMO processor 266, MOD 254, antenna 252, and/or the like) may transmit a plurality of repetitions of an uplink communication based at least in part on the sequence of SRI collections, as described above. In some aspects, a repetition is transmitted using one or more uplink ports that correspond to one or more SRS ports associated with SRS resources identified based at least in part on an SRI collection.

Process 600 may include additional aspects, such as any single aspect or any combination of aspects described below and/or in connection with one or more other processes described elsewhere herein.

In a first aspect, the downlink control information identifies the sequence of SRI collections using a first field of the downlink control information and a second field of the downlink control information. In a second aspect, alone or in combination with the first aspect, the first field is an SRI field of the downlink control information and the second field is an antenna port field of the downlink control information.

In a third aspect, alone or in combination with one or more of the first and second aspects, a value of the first field identifies an index value of a particular mapping of sequences of SRI collections to index values, and a value of the second field identifies the particular mapping. In a fourth aspect, alone or in combination with one or more of the first through third aspects, process 600 further includes receiving a configuration that identifies a transmission rank associated with SRI collections in the sequence of SRI collections, and the particular mapping is associated with the transmission rank.

In a fifth aspect, alone or in combination with one or more of the first through fourth aspects, process 600 further includes receiving information that identifies a mapping of sequences of SRI collections to index values. In a sixth aspect, alone or in combination with one or more of the first through fifth aspects, the information that identifies the mapping identifies a secondary mapping that includes a subset of sequences of SRI collections included in a primary mapping.

In a seventh aspect, alone or in combination with one or more of the first through sixth aspects, the downlink control information identifies an index value of the mapping. In an eighth aspect, alone or in combination with one or more of the first through seventh aspects, the plurality of repetitions are transmitted using at least one duplicate of each SRI collection in a cycle through the sequence of SRI collections. In a ninth aspect, alone or in combination with one or more of the first through eighth aspects, the plurality of repetitions are transmitted using more than one cycle through the sequence of SRI collections.

In a tenth aspect, alone or in combination with one or more of the first through ninth aspects, process 600 further includes receiving information that identifies a mapping of sequences of SRI collections to index values, where SRI collections in the sequence of SRI collections have a same transmission rank and the downlink control information identifies the sequence of SRI collections using a first field of the downlink control information and a second field of the downlink control information. In an eleventh aspect, alone or in combination with one or more of the first through tenth aspects, process 600 further includes determining that the second field is being used to identify the sequence of SRI collections based at least in part on a determination that a quantity of sequences of SRI collections that are identifiable by the first field is less than a quantity of sequences of SRI collections of the mapping. In a twelfth aspect, alone or in combination with one or more of the first through eleventh aspects, process 600 further includes identifying a location in the second field that is being used to identify the sequence of SRI collections based at least in part on a demodulation reference signal identifier of the downlink control information and the transmission rank.

In a thirteenth aspect, alone or in combination with one or more of the first through twelfth aspects, the at least one SRS resource set configuration is for a non-codebook SRS resource set.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
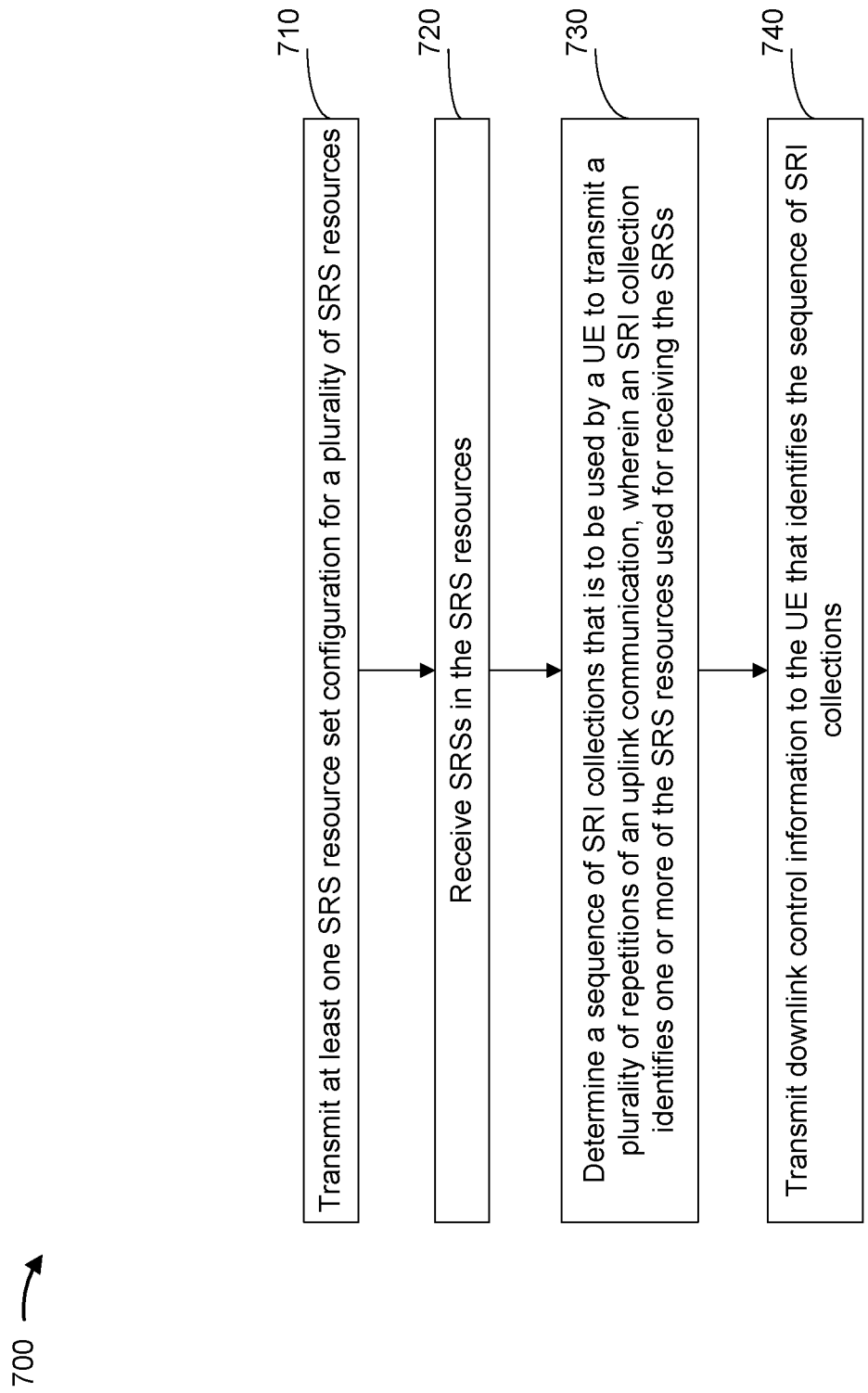
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., base station 110 and/or the like) performs operations associated with signaling sequences of sounding reference signal resource indicator collections for uplink repetitions.

As shown in FIG. 7, in some aspects, process 700 may include transmitting at least one SRS resource set configuration for a plurality of SRS resources (block 710). For example, the base station (e.g., using controller/processor 240, transmit processor 220, TX MIMO processor 230, MOD 232, antenna 234, and/or the like) may transmit at least one SRS resource set configuration for a plurality of SRS resources, as described above.

As further shown in FIG. 7, in some aspects, process 700 may include receiving SRSs in the SRS resources (block 720). For example, the base station (e.g., using antenna 234, DEMOD 232, MIMO detector 236, receive processor 238, controller/processor 240, and/or the like) may receive SRSs in the SRS resources, as described above.

As further shown in FIG. 7, in some aspects, process 700 may include determining a sequence of SRI collections that is to be used by a UE to transmit a plurality of repetitions of an uplink communication, wherein an SRI collection identifies one or more of the SRS resources used for receiving the SRSs (block 730). For example, the base station (e.g., using controller/processor 240 and/or the like) may determine a sequence of SRI collections that is to be used by a UE to transmit a plurality of repetitions of an uplink communication, as described above. In some aspects, an SRI collection identifies one or more of the SRS resources used for receiving the SRSs.

As further shown in FIG. 7, in some aspects, process 700 may include transmitting downlink control information to the UE that identifies the sequence of SRI collections (block 740). For example, the base station (e.g., using controller/processor 240, transmit processor 220, TX MIMO processor 230, MOD 232, antenna 234, and/or the like) may transmit downlink control information to the UE that identifies the sequence of SRI collections, as described above.

Process 700 may include additional aspects, such as any single aspect or any combination of aspects described below and/or in connection with one or more other processes described elsewhere herein.

In a first aspect, the downlink control information identifies the sequence of SRI collections using a first field of the downlink control information and a second field of the downlink control information. In a second aspect, alone or in combination with the first aspect, the first field is an SRI field of the downlink control information and the second field is an antenna port field of the downlink control information.

In a third aspect, alone or in combination with one or more of the first and second aspects, a value of the first field identifies an index value of a particular mapping of sequences of SRI collections to index values, and a value of the second field identifies the particular mapping. In a fourth aspect, alone or in combination with one or more of the first through third aspects, process 700 further includes transmitting a configuration that identifies a transmission rank associated with SRI collections in the sequence of SRI collections, and the particular mapping is associated with the transmission rank.

In a fifth aspect, alone or in combination with one or more of the first through fourth aspects, process 700 further includes transmitting information that identifies a mapping of sequences of SRI collections to index values. In a sixth aspect, alone or in combination with one or more of the first through fifth aspects, the information that identifies the mapping identifies a secondary mapping that includes a subset of sequences of SRI collections included in a primary mapping.

In a seventh aspect, alone or in combination with one or more of the first through sixth aspects, the downlink control information identifies an index value of the mapping. In an eighth aspect, alone or in combination with one or more of the first through seventh aspects, process 700 further includes transmitting an indication that the UE is to transmit the plurality of repetitions using one duplicate of each SRI collection in a cycle through the sequence of SRI collections. In a ninth aspect, alone or in combination with one or more of the first through eighth aspects, process 700 further includes transmitting an indication that the UE is to transmit the plurality of repetitions using more than one cycle through the sequence of SRI collections.

In a tenth aspect, alone or in combination with one or more of the first through ninth aspects, process 700 further includes transmitting information that identifies a mapping of sequences of SRI collections to index values, where SRI collections in the sequence of SRI collections have a same transmission rank and the downlink control information identifies the sequence of SRI collections using a first field of the downlink control information and a second field of the downlink control information.

In an eleventh aspect, alone or in combination with one or more of the first through tenth aspects, the at least one SRS resource set configuration is for a non-codebook SRS resource set.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving at least one sounding reference signal (SRS) resource set configuration for a plurality of SRS resources that correspond to respective SRS ports on which an SRS is to be transmitted;
   transmitting SRSs using the plurality of SRS resources;
   receiving downlink control information that identifies a sequence of SRS resource indicator (SRI) collections, wherein an SRI collection, of the sequence of SRI collections, identifies one or more SRS resources of the plurality of SRS resources used for transmitting the SRSs; and
   transmitting a plurality of repetitions of an uplink communication based at least in part on the sequence of SRI collections,
      wherein a repetition, of the plurality of repetitions, is transmitted, based at least in part on the SRI collection, using one or more uplink ports that correspond to one or more SRS ports associated with the one or more SRS resources.

2. The method of claim 1, wherein the downlink control information identifies the sequence of SRI collections using a first field of the downlink control information and a second field of the downlink control information.

3. The method of claim 2, wherein the first field is an SRI field of the downlink control information and the second field is an antenna port field of the downlink control information.

4. The method of claim 2, wherein a value of the first field identifies an index value of a particular mapping of sequences of SRI collections to index values, and a value of the second field identifies the particular mapping.

5. The method of claim 4, further comprising receiving a configuration that identifies a transmission rank associated with the SRI collection,
   wherein the particular mapping is associated with the transmission rank.

6. The method of claim 1, further comprising receiving information that identifies a mapping of sequences of SRI collections to index values.

7. The method of claim 6, wherein the information that identifies the mapping identifies a secondary mapping that includes a subset of sequences of SRI collections included in a primary mapping.

8. The method of claim 6, wherein the downlink control information identifies an index value of the mapping.

9. The method of claim 1, wherein the plurality of repetitions are transmitted using at least one duplicate of each SRI collection in a cycle through the sequence of SRI collections.

10. The method of claim 1, wherein the plurality of repetitions are transmitted using more than one cycle through the sequence of SRI collections.

11. The method of claim 1,
   wherein SRI collections in the sequence of SRI collections have a same transmission rank, and
   wherein the downlink control information identifies the sequence of SRI collections using a first field of the downlink control information and a second field of the downlink control information.

12. The method of claim 11, further comprising determining that the second field is being used to identify the sequence of SRI collections based at least in part on a determination that a quantity of sequences of SRI collections that are identifiable by the first field is less than a quantity of sequences of SRI collections of the mapping.

13. The method of claim 12, further comprising identifying a location in the second field that is being used to identify the sequence of SRI collections based at least in part on a demodulation reference signal identifier of the downlink control information and the transmission rank.

14. The method of claim 1, wherein the at least one SRS resource set configuration is for a non-codebook SRS resource set.

15. A method of wireless communication performed by a base station, comprising:
   transmitting at least one sounding reference signal (SRS) resource set configuration for a plurality of SRS resources;
   receiving SRSs in the plurality of SRS resources;
   determining a sequence of SRS resource indicator (SRI) collections that is to be used by a user equipment (UE) to transmit a plurality of repetitions of an uplink communication,
      wherein an SRI collection, of the sequence of SRI collections, identifies one or more SRS resources of the plurality of SRS resources used for receiving the SRSs, and
      wherein a repetition, of the plurality of repetitions, is to be transmitted, based on the SRI collection; and transmitting downlink control information to the UE that identifies the sequence of SRI collections.

16. The method of claim 15, wherein the downlink control information identifies the sequence of SRI collections using a first field of the downlink control information and a second field of the downlink control information.

17. The method of claim 16, wherein the first field is an SRI field of the downlink control information and the second field is an antenna port field of the downlink control information.

18. The method of claim 16, wherein a value of the first field identifies an index value of a particular mapping of sequences of SRI collections to index values, and a value of the second field identifies the particular mapping.

19. The method of claim 18, further comprising transmitting a configuration that identifies a transmission rank associated with the SRI collection,
wherein the particular mapping is associated with the transmission rank.

20. The method of claim 15, further comprising transmitting information that identifies a mapping of sequences of SRI collections to index values.

21. The method of claim 20, wherein the information that identifies the mapping identifies a secondary mapping that includes a subset of sequences of SRI collections included in a primary mapping.

22. The method of claim 20, wherein the downlink control information identifies an index value of the mapping.

23. The method of claim 15, further comprising transmitting an indication that the UE is to transmit the plurality of repetitions using one duplicate of each SRI collection in a cycle through the sequence of SRI collections.

24. The method of claim 15, further comprising transmitting an indication that the UE is to transmit the plurality of repetitions using more than one cycle through the sequence of SRI collections.

25. The method of claim 15,
wherein SRI collections in the sequence of SRI collections have a same transmission rank, and
wherein the downlink control information identifies the sequence of SRI collections using a first field of the downlink control information and a second field of the downlink control information.

26. The method of claim 15, wherein the at least one SRS resource set configuration is for a non-codebook SRS resource set.

27. A user equipment (UE) for wireless communication, comprising:
a memory; and
one or more processors coupled to the memory, the one or more processors configured to:
receive at least one sounding reference signal (SRS) resource set configuration for a plurality of SRS resources that correspond to respective SRS ports on which an SRS is to be transmitted;
transmit SRSs using the plurality of SRS resources;
receive downlink control information that identifies a sequence of SRS resource indicator (SRI) collections,
wherein an SRI collection, of the sequence of SRI collections, identifies one or more SRS resources of the plurality of SRS resources used for transmitting the SRSs; and
transmit a plurality of repetitions of an uplink communication based at least in part on the sequence of SRI collections,
wherein a repetition, of the plurality of repetitions, is transmitted, based at least in part on the SRI collection, using one or more uplink ports that correspond to one or more SRS ports associated with the one or more SRS resources.

28. The UE of claim 27, wherein the downlink control information identifies the sequence of SRI collections using a first field of the downlink control information and a second field of the downlink control information.

29. A base station for wireless communication, comprising:
a memory; and
one or more processors coupled to the memory, the one or more processors configured to:
transmit at least one sounding reference signal (SRS) resource set configuration for a plurality of SRS resources;
receive SRSs in the plurality of SRS resources;
determine a sequence of SRS resource indicator (SRI) collections that is to be used by a user equipment (UE) to transmit a plurality of repetitions of an uplink communication,
wherein an SRI collection, of the sequence of SRI collections, identifies one or more SRS resources of the plurality of SRS resources used for receiving the SRSs, and
wherein a repetition, of the plurality of repetitions, is to be transmitted, based on the SRI collection; and
transmit downlink control information to the UE that identifies the sequence of SRI collections.

30. The base station of claim 29, wherein the downlink control information identifies the sequence of SRI collections using a first field of the downlink control information and a second field of the downlink control information.

* * * * *